United States Patent [19]
Perettie et al.

[11] Patent Number: 5,540,997
[45] Date of Patent: Jul. 30, 1996

[54] ALIGNMENT LAYER FOR A LIQUID CRYSTAL IN A LIQUID CRYSTAL DISPLAY DEVICE

[75] Inventors: Donald J. Perettie; Benjamin M. DeKoven, both of Midland, Mich.; David A. Babb, Lake Jackson, Tex.

[73] Assignee: The Dow Chemical Company, Midland, Mich.

[21] Appl. No.: 402,588

[22] Filed: Mar. 13, 1995

[51] Int. Cl.$^6$ .................................................... C09K 19/56
[52] U.S. Cl. ............................ 428/409; 428/1; 359/76; 359/75; 526/247; 526/239; 526/242; 526/243; 526/244; 525/200
[58] Field of Search ...................... 526/247; 428/1, 428/409; 525/200; 359/75, 76, 77

[56] References Cited

U.S. PATENT DOCUMENTS

| | | | |
|---|---|---|---|
| 5,021,602 | 6/1991 | Clement et al. | 558/230 |
| 5,023,380 | 6/1991 | Babb et al. | 568/34 |
| 5,037,917 | 8/1991 | Babb et al. | 526/242 |
| 5,246,782 | 9/1993 | Kennedy et al. | 428/421 |
| 5,331,081 | 7/1994 | Dubal et al. | 528/288 |

OTHER PUBLICATIONS

Scheffer, et al., *Accurate Determination of Liquid–Crystal Tilt Bias Angles*, Journal of Applied Physics, vol. 48, No. 5, pp. 1783–1792 (May 1977).

*Primary Examiner*—Mark Nagumo
*Attorney, Agent, or Firm*—Reid S. Willis

[57] ABSTRACT

An alignment layer for a liquid crystal display device is described. The alignment layer comprises a copolymer of a thermoset polymer containing perfluorinated cyclobutane rings and a thermoplastic polymer containing perfluorinated cylcobutane rings, or a blend of thermoset and thermoplastic homopolymers or copolymers containing perfluorinated cyclobutane rings.

This copolymer or blend provides an alignment layer with a cure temperature of less than 250° C., a low dielectric, and a low moisture content. The resultant alignment layer can also provide surface tilt angles suitable for supertwisted nematic-liquid crystal displays.

16 Claims, No Drawings

ALIGNMENT LAYER FOR A LIQUID CRYSTAL IN A LIQUID CRYSTAL DISPLAY DEVICE

SUMMARY OF THE INVENTION

This invention relates to an alignment layer for a liquid crystal in a liquid crystal display device, wherein the alignment layer comprises a copolymer of a thermoset polymer containing perfluorinated cyclobutane rings and a thermoplastic polymer containing perfluorinated cyclobutane rings, or a blend of thermoset and thermoplastic homopolymers or copolymers containing perfluorinated cyclobutane rings.

BACKGROUND OF THE INVENTION

Although liquid crystals have been known for over 100 years, the interest in liquid crystals has increased dramatically in the last 20 years, particularly for use in electro-optical switching and display devices.

For many types of liquid crystal displays, especially the supertwisted nematic-liquid crystal display (STN-LCD), the superbirefringence (SBE), or the double-supertwist (D-STN), it is necessary that a thin alignment layer be deposited on a glass substrate to orient liquid crystal molecules at a predetermined pretilt angle on the glass surface. It is further advantageous or necessary that this alignment layer be capable of establishing a pretilt angle of 5° or more, so that liquid crystal twist angles in the range of 240° to 270° can be achieved.

Both inorganic and organic alignment layers for liquid crystals are known in the art. An example of an inorganic material is SiO, which is deposited by evaporation onto the glass substrate. Although SiO deposition has the advantage of providing pretilt angles of greater than 10°, this material is not considered to be commercially feasible.

Organic polymers, most notably nylon and polyimides, have also been used as alignment layers. The organic polymer is first deposited on the glass substrate by any suitable means, such as spin coating, screen printing, or roller coating. The polymer is then cured, then rubbed with fabric in a chosen direction to create a surface which provides alignment for the liquid crystal as well a pretilt angle. This angle should be as high as possible for fast response STN-LCDs. Recently, Dubal et al., in U.S. Pat. No. 5,331,081, incorporated herein by reference has disclosed the use of perfluorinated polyamides as alignment layers for liquid crystal switching and display devices. These perfluorinated polyamides reportedly have the advantage of providing suitable orientation layers which can be cured at temperatures below 250° C., and which provide a surface tilt angle of 9°.

There is a continuing interest in developing new alignment layer materials which provide high surface tilt angles and can be cured at temperatures below 50° C.

SUMMARY OF THE INVENTION

The present invention is an alignment layer for a liquid crystal display device, the alignment layer comprising a copolymer or a blend of homopolymers derived from a first monomer having the Formula (I):

$$CF_2=CF-X-R-X-CF=CF_2 \quad (I)$$

and a second monomer having the Formula (II):

$$CF_2=CF-X-R'-(X-CF=CF_2)_m \quad (II)$$

wherein R represents an unsubstituted or inertly substituted divalent molecular structure; R' is an unsubstituted or inertly substituted molecular structure that is at least trivalent; m is at least 2; and each X is independently a bond or any group which links R or R' and a perfluorovinyl group.

This copolymer or blend provides an alignment layer with several desirable properties, including a cure temperature of less than 250° C., low dielectric, and a low moisture absorption. Significantly, the copolymer of the present invention can provide surface tilt angles of greater than 10°, and offers the possibility of "tuning" a surface tilt angle to a desired level.

DETAILED DESCRIPTION OF THE INVENTION

The material used to prepare the alignment layer of the present invention is a copolymer of a first and a second perfluorethylene monomer, a copolymer derived from oligomers of a first and a second perfluorethylene monomer, or a polymeric blend derived from mixing oligomers, homopolymers, or copolymers derived from a first and a second perfluorethylene monomer. The first perfluorethylene monomer is represented by Formula (I):

$$CF_2=CF-X-R-X-CF=CF_2 \quad (I)$$

wherein R represents an unsubstituted or inertly substituted divalent molecular structure, and each X is independently a bond or any group which links R and a perfluorovinyl group. The preparation of the monomer of Formula (I) and polymers derived therefrom are disclosed in U.S. Pat. Nos. 5,021,602, 5,037,917, and 5,246,782, all incorporated herein by reference.

The term "inertly substituted" is used to refer to substituents that do not react undesirably with perfluorovinyl groups during the polymerization process.

Preferably, each X is independently a bond, O, S, P, N, Si, B, a carboxylic ester, a thiocarboxylic ester, a sulfone, a sulfoxide, carbonyl, or a thiocarbonyl group. More preferably, each X is S or O, and most preferably, each X is O.

R is any inert divalent molecular structure, and preferably comprises inertly substituted or unsubstituted aliphatic, cycloaliphatic, aromatic, or heterocyclic groups, or combinations thereof. R is more preferably an unsubstituted or inertly substituted aromatic nucleus connecting the X groups, such as unsubstituted or inertly substituted phenylene, biphenylene, naphthylene, anthrylene, fluorylene, and phenanthrylene. R is most preferably unsubstituted or inertly substituted 4,4'-biphenylene.

Examples of preferred first monomers represented by Formula (I) include 4,4'-bis(trifluorovinyloxy)biphenyl; 1,3-bis(trifluorovinyloxy)benzene; 1,4-bis(trifluorovinyloxy)benzene; 4,4'-bis(trifluorovinyloxyphenyl)sulfide; 2,2-bis(4-trifluorovinyloxyphenyl)-1,1,1,3,3,3-hexafluoropropane; 2,2-bis(4-trifluorovinyloxyphenyl)propane; 2,7-bis(trifluorovinyloxy)naphthalene; 2,6-bis(trifluorovinyloxy)naphthalene; 9,9-bis(4-trifluorovinyloxyphenyl)fluorene; 4,4'-bis(trifluorovinyloxy)-α-methylstilbene; 1,1-bis(4-trifluorovinyloxyphenyl)-1-phenyl ethane; and 4,4'-bis(trifluorovinyloxy)benzophenone. More preferred first monomers include 4,4'-bis(trifluorovinyloxy)biphenyl, 2,2-bis(4-trifluorovinyloxyphenyl)propane; 1,3-bis(trifluorovinyloxy)benzene; and 9,9-bis(4-trifluorovinyloxyphenyl)fluorene. The first monomer is most preferably 4,4'-bis(trifluorovinyloxy)biphenyl, the preparation and polymerization of which can be found in U.S. Pat. No. 5,037,917, col. 12, beginning at line 60.

The second perfluorethylene monomer is represented by Formula (II):

$$CF_2=CF-X-R'-(X-CF=CF_2)_m \qquad (II)$$

where R' represents an unsubstituted or inertly substituted molecular structure that is at least trivalent, m is at least 2, and X is as hereinbefore defined.

R' is preferably a trivalent or tetravalent aromatic moiety, more preferably a trivalent aromatic moiety; m is preferably 2 or 3, more preferably 2. Representative examples of preferred perfluoroethylene monomers of Formula (II) include 1,1,1-tris(4-trifluorovinyloxyphenyl)ethane; tris(4-trifluorovinyloxyphenyl)borane; tris(4-trifluorovinyloxyphenyl)phosphine; and tris(4-trifluorovinyloxyphenyl)phosphine oxide; with 1,1,1-tris(4-trifluorovinyloxyphenyl)ethane being more preferred. The monomers of Formula (II) can be prepared in accordance with the teachings of U.S. Pat. No. 5,023,380, col. 4, starting on line 38.

The alignment layer of the present invention can be prepared by heating a mixture of the first and second monomers under such conditions to form a perfluorocyclobutane copolymer represented by Formula (III):

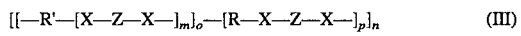

$$[[-R'-[X-Z-X-]_m]_o-[R-X-Z-X-]_p]_n \qquad (III)$$

where Z is a 1,2- or 1,3-disubstituted, and preferably a 1,2-disubstituted perfluorocyclobutane group, and n, o, and p are positive integer representing the number of repeating units, and R', m, and X are as defined hereinbefore.

The copolymer is preferably formed by the combination of the first monomer and the second monomer that produces an alignment layer having a pretilt angle of at least 5°, more preferably at least 10°. The alignment layer is preferably prepared from a copolymer derived from about a 10:90; more preferably from about a 25:75, and most preferably from about a 40:60, to about a 90:10, more preferably to about a 75:25, and most preferably to about a 60:40 mole to mole mixture of first monomer to second monomer. An especially preferred alignment layer is prepared from a copolymer derived from about a 50:50 mole to mole mixture of 1,1,1-tris(4-trifluorovinyloxyphenyl)ethane and 4,4'-bis(trifluorovinyloxy)biphenyl.

Temperatures suitable for the preparation of the copolymer vary with the structures of the monomers. Temperatures above 40° C. are generally suitable for formation of perfluorocyclobutane rings, preferably above 50° C., and more preferably above 100° C. Temperatures above 450° C. are preferably avoided because perfluorocyclobutanes are generally unstable above such temperatures.

The alignment layer of the present invention can also be prepared by mixing an oligomer of the first monomer with an oligomer of the second monomer, then polymerizing the mixture to form a block copolymer; or prepared by blending homopolymers or copolymers derived from the first and the second monomers.

The copolymer or polymer blend used as an alignment layer in the present invention is typically applied to the area to be coated as a polymer solution or a soluble polymer precursor, by any suitable means including spray-coating, spin-coating, dip-coating, screen-printing, or roller-coating processes. Using the spin coating method, the concentration of copolymer or polymer blend and spin speeds are chosen to produce an alignment layer having a desired thickness, typically in the range of about 100 to about 1000 angstroms, more preferably 250 to 750 angstroms. Preferably the concentration of the polymer in a solvent for the polymer, such as mesitylene, ranges from about 1, more preferably from about 2, to about 10 weight percent, more preferably to about 8 percent, based on the weight of solvent and polymer. The spin coater is preferably spun at a velocity ranging from about 500, more preferably 1000, to about 10,000 rpm, more preferably to about 6000 rpm. The film is then cured by heating, preferably to a temperature in the range of about 180° to about 250° C., and for a time typically ranging from about 5 minutes to about an hour.

The cured alignment layer is rubbed by any suitable means for achieving a pretilt angle, preferably cross-directionally with a rub machine comprising a rotating cylinder under which the substrate passes. The rotating cylinder is fitted with any suitable rubbing cloth, preferably a rayon velvet material. The rub machine is preferably equipped with a means to vary rub strength, which is typically measured in terms of cloth pile contact length. This cloth pile contact length is sufficiently long to yield a useful pretilt angle, yet sufficiently short to prevent removal of the cured alignment layer. The cloth pile contact length, preferably rayon pile contact length, is preferably at least about 0.2 mm, more preferably at least about 0.3 mm, and most preferably about 0.5 mm.

The following examples are provided to illustrate the invention but are not intended to limit the scope thereof.

EXAMPLE 1

Preparation of a 50:50 Copolymer Derived from 1,1,1-Tris(4-trifluorovinyloxyphenyl)ethane and 4,4'-Bis(trifluorovinyloxy)biphenyl The monomers 4,4'-bis(trifluorovinyloxy)biphenyl and 1,1,1-tris(4-trifluorovinyloxyphenyl)ethane are prepared according to the methods disclosed in U.S. Pat. No. 5,037,917, and U.S. Pat. No. 5,023,380, supra. The 50:50 copolymer sample is prepared by heating a nitrogen-purged solution of the trifunctional monomer 1,1,1-tris(4-trifluorovinyloxyphenyl)ethane (20.04 g, 0.0367 mole) and the bifunctional monomer 4,4'-bis(trifluorovinyloxy)biphenyl (12.7 g, 0.0367 mole) in 33.0 g of fresh mesitylene at 150° C. for 12.5 hours. The resulting copolymer solution has a weight average molecular weight of about 8400, as standardized against polystyrene.

EXAMPLE 2

Construction of a Test Cell and Measurement of the Pretilt Angle for the Copolymer of Example 1

Two glass substrates coated with indium/tin oxide are cleaned in an ultrasonic bath, then further cleaned with deionized water and isopropanol, followed by drying. The substrates are then coated with a solution containing 6 weight percent of the copolymer of Example 1 and 94 weight percent mesitylene, using a spin coater at 4000 rpm for 30 seconds. The coated material is cured at 220° C. for 30 minutes to form a polymer film having a film thickness of about 300 angstroms.

The cured coatings are rubbed with a rayon-velvet covered rubbing machine having a rotational velocity of 550 rpm. The rub strength, as measured by rayon pile contact length, varies from 0.2 mm to 0.5 mm. The substrates are then bonded plane parallel with one another at a spacing of 25 microns. (Glass fiber spacers dispersed in isopropanol are sprayed onto one of the substrates to ensure proper spacing.) A UV-curable adhesive is then used to seal the cells.

After cell assembly, the cells are vacuum filled (20 mtorr) with a nematic liquid crystal, E7, (manufactured by BDH, a subsidiary of Merck) whereupon the cells are finally sealed with 5-minute epoxy, and inspected for uniformity of alignment.

Pretilt measurements are carried out using a magnetic null method, which involves finding an angle of incidence for which an applied magnetic field has no effect on phase retardation. In this case, the liquid crystal director is aligned between the magnet poles. The method uses HeNe polarized laser light. This method is described by Scheffer et al., J. Appl. Phys. Vol. 48, No. 5, May 1977, 1783–1792, incorporated herein by reference.

The following Table illustrates the effect of polymer composition and pile contact length on the pretilt angle. Pretilt angle measurements of thermoset and thermoplastic homopolymers are included for comparative purposes. The alignment layer from the thermoset and thermoplastic homopolymers is prepared as described in Example 2, except that, for the thermoplastic homopolymer, a 2.5 weight percent solution, based on the weight of the homopolymer and mesitylene, is used to coat the substrate, and the solution is spin coated at 3000 rpm for 30 seconds. The abbreviations Tris (Comparative Sample A) and Bis (Comparative Sample B) refer to homopolymers derived from 1,1,1-tris(4-trifluorovinyloxyphenyl)ethane and 4,4'-bis(trifluorovinyloxyphenyl)biphenyl, respectively; and 50:50 Tris:Bis (Samples 1–4) refers to the 50:50 copolymer as prepared in Example 1.

| Sample | Polymer | Rayon Pile Contact Length (mm) | Pretilt angle |
| --- | --- | --- | --- |
| Comp. A | Tris | 0.3 | 90°* |
| Comp. B | Bis | 0.3 | 3.9° |
| 1 | 50:50 Tris:Bis | 0.2 | ** |
| 2 | 50:50 Tris:Bis | 0.3 | 13.8° |
| 3 | 50:50 Tris:Bis | 0.4 | 15.5° |
| 4 | 50:50 Tris:Bis | 0.5 | 18° |

*no surface alignment
**nonuniform surface alignment

What is claimed is:

1. An alignment layer for a liquid crystal display device, wherein said alignment layer comprises a rubbed copolymer of a first and a second monomer or a blend of homopolymers of the first and the second monomer, the first monomer having the formula:

$$CF_2=CF-X-R-X-CF=CF_2$$

and the second monomer having the formula:

$$CF_2=CF-X-R'-(X-CF=CF_2)_m$$

wherein R represents an unsubstituted or inertly substituted divalent molecular structure; R' is an unsubstituted or inertly substituted molecular structure that is at least trivalent; m is at least 2; and each X is independently a bond or any group which links R or R' and a perfluorovinyl group, and wherein the alignment layer has a pretilt angle of at least 5°.

2. The alignment layer of claim 1 wherein m is 2 and the first monomer is selected from the group consisting of 4,4'-bis( trifluorovinyloxy)biphenyl; 1,3-bis(trifluorovinyloxy)benzene; 1,4-bis(trifluorovinyloxy)benzene; 4,4' -bis(trifluorovinyloxyphenyl) sulfide; 2,2-bis(4-trifluorovinyloxyphenyl)-1,1,1,3,3,3-hexafluoropropane; 2,2-bis(4-trifluorovinyloxyphenyl)propane; 2,7-bis(trifluorovinyloxy)naphthalene; 2,6-bis(trifluorovinyloxy)naphthalene; 9,9-bis(4-trifluorovinyloxyphenyl)fluorene; 4,4'-bis(trifluorovinyloxy)-α-methylstilbene; 1,1-bis(4-trifluorovinyloxyphenyl)-1-phenyl ethane; and 4,4'-bis(trifluorovinyloxy)benzophenone.

3. The alignment layer of claim 1 wherein the second monomer is selected from the group consisting of 1,1,1-tris(4-trifluorovinyloxyphenyl)ethane; tris(4-trifluorovinyloxyphenyl)borane; tris(4-trifluorovinyloxyphenyl)phosphine; and tris(4-trifluorovinyloxyphenyl)phosphine oxide.

4. The alignment layer of claim 1 wherein the first monomer is 4,4'-bis(trifluorovinyloxy)biphenyl.

5. The alignment layer of claim 4 wherein the second monomer is 1,1,1-tris(4-trifluorovinyloxyphenyl)ethane.

6. The alignment layer of claim 1 which comprises a copolymer derived from about a 10:90 to about a 90:10 mixture of the first monomer and the second monomer.

7. The alignment layer of claim 6 which comprises a copolymer derived from about a 25:75 to about a 75:25 mixture of the first monomer and the second monomer.

8. The alignment layer of claim 7 which comprises a copolymer derived from about a 40:60 to about a 60:40 mixture of the first monomer and the second monomer.

9. The alignment layer of claim 8 which comprises a copolymer derived from about a 40:60 to about a 60:40 mixture of 4,4'-bis(trifluorovinyloxy)biphenyl and 1,1,1-tris(4-trifluorovinyloxyphenyl)ethane.

10. The alignment layer of claim 9 which comprises a copolymer derived from about a 50:50 mixture of 4,4'-bis(trifluorovinyloxy)biphenyl and 1,1,1-tris(4-trifluorovinyloxyphenyl)ethane.

11. An alignment layer for a liquid crystal display device, wherein said alignment layer comprises a copolymer represented by the structure:

$$[[-R'-[X-Z-X-]_m]_o-[R-X-Z-X-]_p]_n$$

wherein R represents an unsubstituted or inertly substituted divalent molecular structure; R' is an unsubstituted or inertly substituted molecular structure that is at least trivalent; m is at least 2; each X is independently a bond or any group which links R or R' and a perfluorovinyl group; Z is a 1,2- or 1,3-disubstituted perfluorocyclobutane group; and n, o, and p are positive integers representing the number of repeating units, with the proviso that n, o, and p are such that the alignment layer has a pretilt angle of at least 5° after rubbing.

12. An alignment layer for a liquid crystal display device, wherein said alignment layer comprises a rubbed copolymer of a first and a second monomer or a blend of homopolymers of the first and the second monomer wherein the first monomer is selected from the group consisting of 4,4'-bis(trifluorovinyloxy)biphenyl; 1,3-bis(trifluorovinyloxy)benzene; 1,4-bis(trifluorovinyloxy)benzene; 4,4'-bis(trifluorovinyloxyphenyl)sulfide; 2,2-bis(4-trifluorovinyloxyphenyl)-1,1,1,3,3,3-hexafluoropropane; 2,2-bis(4-trifluorovinyloxyphenyl)propane; 2,7-bis(trifluorovinyloxy)naphthalene; 2,6-bis(trifluorovinyloxy)naphthalene; 9,9-bis(4-trifluorovinyloxyphenyl)fluorene; 4,4'-bis(trifluorovinyloxy)-α-methylstilbene; 1,1-bis(4-trifluorovinyloxyphenyl)-1-phenyl ethane; and 4,4'-bis(trifluorovinyloxy)benzophenone; and the second monomer is selected from the group consisting of 1,1,1-tris(4-trifluorovinyloxyphenyl)ethane; tris(4-trifluorovinyloxyphenyl)borane; tris(4-trifluorovinyloxyphenyl)phosphine; and tris(4-trifluorovinyloxyphenyl)phosphine oxide, and wherein the alignment layer has a pretilt angle of at least 5°.

13. The alignment layer of claim 12 which comprises a copolymer derived from about a 10:90 to about a 90:10 mixture of the first monomer and the second monomer.

14. The alignment layer of claim 13 which comprises a copolymer derived from about a 25:75 to about a 75:25 mixture of the first monomer and the second monomer.

15. The alignment layer of claim 14 which comprises a copolymer derived from about a 40:60 to about a 60:40 mixture of the first monomer and the second monomer.

16. The alignment layer of claim 15 which comprises a copolymer derived from about a 50:50 mixture of the first monomer and the second monomer.

* * * * *